United States Patent
Morse et al.

(10) Patent No.: US 6,663,782 B2
(45) Date of Patent: Dec. 16, 2003

(54) SYSTEM AND METHOD TO TREAT LIVESTOCK WASTE

(76) Inventors: Dwain E. Morse, 2655 Montrose Pl., Santa Barbara, CA (US) 93105; Wade O. Morse, 1536 W. Valerio St., Santa Barbara, CA (US) 93101; Michael P. Morse, 34 La Vuelta, Santa Barbara, CA (US) 93108; Raffael Jovine, 457 W. 57th St., Apt #503, New York, NY (US) 10019

( * ) Notice: Subject to any disclaimer, the term of this patent is extended or adjusted under 35 U.S.C. 154(b) by 336 days.

(21) Appl. No.: 09/765,536

(22) Filed: Jan. 19, 2001

(65) Prior Publication Data

US 2001/0025820 A1 Oct. 4, 2001

Related U.S. Application Data

(63) Continuation-in-part of application No. 09/417,284, filed on Oct. 13, 1999.
(60) Provisional application No. 60/178,009, filed on Jan. 24, 2000.

(51) Int. Cl.$^7$ .............................. C02F 1/24; C02F 11/00; C02F 9/02; C02F 1/44
(52) U.S. Cl. ..................... 210/703; 210/704; 210/724; 210/652; 210/806
(58) Field of Search ............................ 210/639, 638, 210/703, 704, 724, 652, 806

(56) References Cited

U.S. PATENT DOCUMENTS

| | | | | |
|---|---|---|---|---|
| 2,360,811 | A | * | 10/1944 | Kelly et al. |
| 3,917,526 | A | * | 11/1975 | Jennings |
| 5,514,282 | A | * | 5/1996 | Hibbard et al. |
| 5,591,348 | A | * | 1/1997 | Felder et al. |
| 6,106,711 | A | * | 8/2000 | Morse et al. |
| 6,171,488 | B1 | * | 1/2001 | Morse et al. |

* cited by examiner

Primary Examiner—Thomas M. Lithgow
(74) Attorney, Agent, or Firm—Kelly Bauersfeld Lowry & Kelley, LLP (57) ABSTRACT

A method for treating livestock wastewater includes directing screened wastewater to a hydrocyclone/separation tank system. The hydrocyclone directs the wastewater stream in a generally helical fashion to create bubble-particle aggregates. Activating chemicals can be added to the wastewater upstream of the hydrocyclone or within the hydrocyclone itself. The wastewater is channeled from an outlet of the hydrocyclone through a diffuser to a separation tank, where the bubble-particle aggregates are separated as they rise and accumulate on a free liquid surface of the tank. The treated wastewater settles below the bubble-particle aggregate accumulation and is transferred to a reservoir for later use as irrigation water or barn wash water. Salts may also be removed from the wastewater by filtering the wastewater through salt-removing filters before the wastewater is transferred to the reservoir.

16 Claims, 5 Drawing Sheets

SYSTEM AND METHOD TO TREAT LIVESTOCK WASTE

RELATED APPLICATION

This application is a continuation-in-part of U.S. patent application Ser. No. 09/417,284, filed Oct. 13, 1999; and further claims priority from provisional application Ser. No. 60/178,009, filed Jan. 24, 2000.

BACKGROUND OF THE INVENTION

The invention relates to liquid flotation separation components, Systems and methods. More particularly, the present invention relates to liquid conditioning components, systems and methods that treat livestock waste to remove contaminants such as nitrates and microbes from carrier water streams such as barn or yard wash water.

Livestock operations produce waste in the form of manure and urine. For the purpose of this application, the term "feedlot" means confined animal or milk production operations in areas that produce no forage. In 1992, the USDA estimated the number of feedlots at 510,000. In addition, there are over 1,000 dairies in California alone. The same year, it estimated the total number of animals in operations with over 500 animals at 6.4 million cattle, 29 million hogs, and 744 million chickens. The average dairy cow produces over a cubic foot of waste daily. It is clear that the tonnage of feedlot waste is high.

Current federal regulations prohibit discharge of feedlot wastewater to surface waters unless extreme storms cause overflows from containment systems designed to hold wastewater and runoff. An extreme storm is defined as 24 hours worth of a 25-year storm. Although these regulations have been in place since 1974, risks to the environment and fisheries persist.

Feedlot waste has contaminated aquifers, the air, and surface waters such as streams, rivers, lakes, bays, estuaries and the ocean. For example, the storms that flooded the east coast of the United States in recent years resulted in discharge of millions of gallons of hog and other livestock waste into the Chesapeake Bay and other fisheries.

Composting of livestock waste into useful materials has been practiced for millennia. However, composting of fresh livestock waste in the quantities in which it is produced on a modern feedlot is impractical. This is because aerobic composting will not take place if: 1) the moisture content is above 65%, which most fresh manure or its carrier streams are; 2) the carbon to nitrogen ratio is not kept within a narrow range; 3) adequate oxygen cannot reach into the waste to support the microbes; or 4) the temperature drops below a minimum necessary to sustain the microbe population. Absent large-scale solids mixing equipment, which is rarely employed, the carbon to nitrogen ratio is fixed by the type of livestock and its feed. In addition, some farms screen out the carboniferous solids for reuse. Thus, the ratio is not adjusted to bring it into the compostable range. Airborne oxygen cannot penetrate more than a few inches into piled manure (e.g. windrows), leaving the volume of manure inside this surface layer deficient in oxygen. Temperatures in most livestock raising areas in the continental U.S. fall below 40° F. for substantial periods. If pile temperature falls below 55° F., microbial activity essential for composting will slow or stop. Thus, direct composting of the entire waste stream in feedlot operations over 300 animals (cattle equivalents) is rarely employed.

Feedlot waste is primarily manure and urine in a carrier stream of water. There is much variability in feedlot waste management. However, most feedlot operations use gravity settling, which removes primarily inorganic constituents from the carrier stream and leaves the organic constituents, followed by some form of biological processing. Usually, the stream passes from settling pits into lagoons, where the organic constituents are food to microbes. Aerobic microbial digestion of the food requires oxygen and results in biomass, heat, carbon dioxide and water according to the following formula:

Food+$O_2$→Biomass+energy (heat)+$CO_2$+water

As bacteria age and die, their cells create biological oxygen demand (BOD) of their own and the dead bacteria become food for the others. As the cycle repeats, more of the biomass is converted to $CO_2$ and water. Consequently, the longer the time period allowed for decomposition, the lower the volume of the resulting sludge.

However, if high enough, as in feedlots, this BOD in the carrier stream of water uses up the dissolved oxygen in the water, eventually killing the aerobic bacteria and changing the environment to one that supports anaerobic bacteria. Anaerobic decomposition produces methane, hydrogen sulfide, ammonia, and $CO_2$. Hydrogen sulfide and the ammonia are odorous and toxic air contaminants. Also, high BOD surface runoff damages downstream receiving waters by, for example, suffocating fish. Therefore, BOD must be substantially reduced before the water leaves the livestock operation.

The technologies aimed at reducing BOD have evolved with concentrations of human population. Manipulation of contact time has evolved as a primary way to treat organic wastewaters. Technologies have moved from unaerated shallow lagoons through mixed and aerated ponds. These methods share the disadvantages of large land area requirements, inefficient aeration, little process control, and the additional biological oxygen demand generated by the algae that tends to grow on the surface. Trickling filters, which repeatedly flow the water to be treated over a media containing air spaces, addressed the land area problem. However, these filters retain the problem of little process control and suffer from freezing in the winter and plugging.

To address the plugging, freezing, large land requirements and inefficient aeration problems, activated sludge systems were developed and are the main technology used today for human waste. These systems mix food, bacteria nutrients and oxygen enough to prevent flotation and settling. Oxygen is dissolved into the liquid by mechanical means. However, the high cost and complexity of these technologies has been a barrier to their use in feedlot operations.

Instead of employing activated sludge systems, the typical 300+ animal California dairy operation flushes stalls with water, screens the water for solids later processed into bedding, employs sedimentation to separate the mineral particles and other materials heavier than water, sends the supernatant to one or more lagoons where microbes convert dissolved solids to suspended solids in the form of more microbes, and land applies the biologically altered water by irrigation, knifing it into the soil or injecting it into the ground.

The liquid that is land applied typically contains high concentrations of nitrate. This is because the age of the sludge in the lagoons and the liquid from the lagoons that is reused as wash water is over seven days old. Feedlot wastewater systems contain large quantities of nitrifying bacteria, which use ammonia as food, because the wastewater is over 5 days old.

Nitrification increases the BOD of the water. In addition, nitrates are toxic to cattle and humans. Nitrate poisoning in cattle produces spontaneous abortion and death. State and federal regulations prohibit dosing the land with more nitrates than the vegetation grown thereon can take up. This limits the amount of used water that farm operators may dispose of via land application.

U.S. Pat. No. 5,698,110 (Wyatt, et al) addresses animal excrement by filtering the solids, mixing in a lime and cellulose-based deodorizer, and drying. This technology, however, does not address the liquid. Cattle waste averages only 13% solids, the rest being liquid. Thus, the Wyatt invention does not address over ¾ of the waste stream.

U.S. Pat. No. 5,472,472 (Northrup) addresses animal excrement by precipitating solids in a reactor, passing the slurry to a bioreactor where it is aerobically and anaerobically treated, and then to a constructed wetland. It claims to treat the water to a generally nutrient-free discharge that can be used for irrigation. The system requires aerators, mixing of metallic salts to precipitate phosphorous, a pond with aerobic, anaerobic and facultative bacteria, and a wetland divided into cells as the last step. This requires a large land area, has little process control, and is complex. As such, it retains several of the main disadvantages of established technologies.

Waste and process water treatment in non-farm operations frequently involves adding polymeric materials to the stream. Polymers are long chain molecules. This aspect makes them effective at joining with contaminants in the stream to ferry them out. Unfortunately, the long molecular chain nature of polymer molecules results in molecular damage under established high shear mixing methods. Damaged polymer molecules usually do not function as well, necessitating increases in dosage. As dosage increases, polymer usage, and hence cost, are increased. A way is needed to add polymers to liquid streams without damaging the polymers. In addition, polymer molecule charges tend to be "self-satisfying", which means that positive charges at one site tend to pair with negative charges elsewhere along the length. This causes the polymer molecule to twist into a knot. In this coiled form, the charge sites of the polymer molecule are much less available for connecting with contaminants in the stream and the polymer is less effective, again necessitating higher dosing. Established methods for uncoiling polymers include pH adjustment. A non-chemical method to accomplish the same thing would reduce or obviate the need for pH-adjusting chemicals.

Established mixing methods do not fully uncoil polymeric additives, leaving charge sites unavailable to contaminants in the stream. Thus, in order to optimize the performance of polymers and minimize their dosages, a method is needed of delivering them to the stream in a state where the number of charged sites available to the water is maximized without damaging the molecules.

The solids component of feedlot waste contains a substantial proportion of salt, averaging between 4% and 9%. Salt increases the electroconductivity of soil, makes the soil less productive, and is a source of leachable salts to surface waters. Such salt is dissolved rather than suspended, and so cannot be addressed as a particulate. This severely limits the options for salt reduction. Currently, no salt removal technology is accepted in the feedlot industry.

Salt can be addressed through osmosis, in particular, using osmotic membranes. However, such membranes "blind" or are clogged by suspended solids and microbial enzymes, which are abundant in feedlot waste streams. Polymeric coagulants and flocculants, which can remove suspended solids, also tend to blind these membranes. These practical problems have prevented osmosis from being used to reduce salt load in feedlot waste.

Accordingly, there is a need for an ecologically suitable means for managing animal waste that minimizes or eliminates the disadvantages of the prior art, including insufficient process control, large land area requirements, complexity, and anaerobic digestion byproducts (odor, toxic air contaminants). What is also needed is an improved process for the biological transformation of animal wastes into useful materials. What is further needed is a process that efficiently delivers surface chemistry that reduces the BOD of feedlot wastewater. The present invention fulfills these needs, and provides other related advantages.

SUMMARY OF THE INVENTION

The treatment method and system of the present invention provides an efficient and cost-effective way of treating feedlot wastewater streams by reducing the biological oxygen demand (BOD). This is accomplished by reducing the nutrient concentration to a level at which microbes can convert the remaining nutrients quickly to innocuous or useful byproducts. The system employs a hydrocyclone to aerate wastewater and maximize particle-bubble contact, followed by flotation to separate particles and nutrients from the stream. The system is designed to work with existing installed treatment equipment, allow real time process control and be simple to operate. It is inserted into the existing waste handling loop after screening and settling and before the first lagoon.

The treatment method generally comprises the steps of first screening coarse solids from the feedlot wastewater. Coarse solids are those any of whose dimensions exceed the smallest dimension of the aperture in the hydrocyclone head. Inorganic undissolved solids are then removed from the screen wastewater. Bubble-particle aggregates are created by directing the wastewater into an inlet of a hydrocyclone. The wastewater is then channeled from an outlet of the hydrocyclone to a separation tank. The bubble-particle aggregates are separated from the wastewater by allowing the bubble-particle aggregates to rise and accumulate on a free liquid surface of the tank, and the wastewater to settle below the bubble-particle aggregates. The bubble-particles are then removed from the tank, and the treated wastewater transferred to a holding reservoir lagoon. If desired, salts may be removed from the wastewater by filtering the wastewater through salt-removing filters before the treated wastewater is transferred to the reservoir lagoon. Water from the lagoon may be reused as irrigation or barn flush water.

Addition of chemicals may be required to enhance formation of flocs for flotation. A flocculent and/or a coagulant is added to the wastewater either upstream of the hydrocyclone or into the hydrocyclone. The pH of the wastewater stream may require adjustment to minimize the quantity of polymer needed and also to optimize the performance of the polymer. Thus, a pH adjusting chemical is often added to the wastewater upstream any coagulants or flocculants.

The bubble-particle aggregate creation and separation steps can be accomplished using various systems. In its simplest form, the stream of wastewater is directed through the hydrocyclone and channeled into a separation tank. Bubble-particle aggregates are allowed to accumulate at a free liquid surface of the tank, while the treated wastewater is removed from the tank to a reservoir lagoon.

In a second embodiment, referred to as a small footprint embodiment, the hydrocyclone defines a first chamber. The hydrocyclone is configured to pass the wastewater through an inlet thereof to an outlet thereof in a generally helical manner to create the bubble-particle aggregates. A second chamber peripherally surrounds the outlet of the hydrocyclone so as to be in fluid communication therewith. The second chamber has a generally upwardly directed outlet. A third chamber peripherally surrounds the outlet of the second chamber so as to be in fluid communication therewith. The third chamber has a generally downwardly directed outlet. A fourth chamber defined by the separation tank peripherally surrounds the outlet of the third chamber so as to be in fluid communication therewith. The bubble-particle aggregates float to the surface of the tank where they are removed. The tank includes an outlet disposed below a liquid surface thereof for transferring the treated wastewater to the reservoir lagoon.

A third embodiment, referred to as a non-space-limited embodiment, includes the hydrocyclone configured to pass the wastewater through an inlet thereof to an outlet thereof in a generally helical manner to create the bubble-particle aggregates. First and second pits are in alternate fluid communication with the outlet of the hydrocyclone and alternatively serve as a receiving pit when receiving wastewater from the hydrocyclone, and a quiescent separation pit when not receiving wastewater from the hydrocyclone. Each pit has an outlet, which can be selectively opened for transferring the separated liquid from the pit to the reservoir when the pit is in its quiescent state. Means are also provided for removing the bubble-particle aggregates from the quiescent pit.

In a fourth embodiment, referred to as a vaned tank embodiment, the hydrocyclone, which is configured to pass the wastewater therethrough in a generally helical manner to create the bubble-particle aggregates, is in fluid communication with a separation tank. The outlet of the hydrocyclone is typically immersed within liquid of the separation tank. The tank includes a plurality of vanes arranged to facilitate the separation of the treated water from the bubble-particle aggregates by directing the bubble-particle aggregates to a free liquid surface of the tank, while channeling treated wastewater below the vanes. Preferably, the tank includes a downwardly directed ramp below the outlet of the hydrocyclone and a baffle spaced from the ramp to direct the wastewater from the hydrocyclone outlet below the vanes within the tank. An outlet is disposed in the tank below the free liquid surface thereof for transferring the treated wastewater to the reservoir.

By removing fecal and urine particles before they are converted to nitrate and nitrite by nitrifying bacteria, the invention allows the water to carry a lower load of nutrients and thus a lower BOD to the lagoon. The lower load of nutrients supports a smaller population of microbes per unit volume, which prevents build up in the lagoon of both toxic levels of the products of bacterial digestion and algae. The BOD of the water stays low enough to prevent the dissolved oxygen in the water from being used up and transitioning into anaerobic conditions. Windborne microbes populate the lagoon and convert dissolved solids (nutrients) into suspended solids (microbial cells), which are removed as particles during the next pass as wash water through the invention. This water can be used as irrigation water or reused as wash water.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

The treatment method of the present invention provides an efficient and cost-effective way of treating feedlot wastewater streams by reducing the biological oxygen demand (BOD) by reducing the nutrient concentration to a level at which microbes can convert the remaining nutrients quickly to innocuous or useful byproducts.

Figure 1:
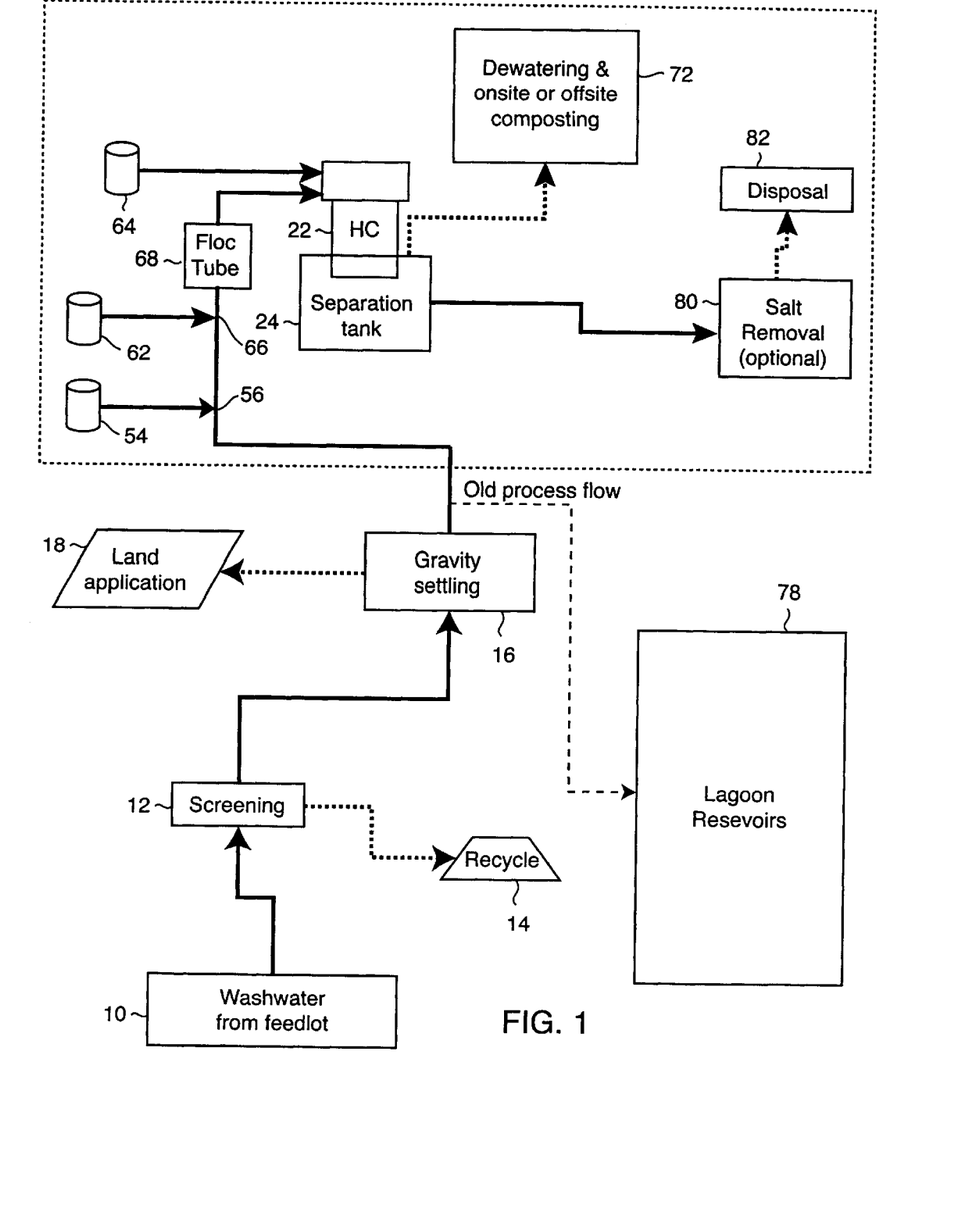
FIG. 1 is a block diagram of the invention as inserted into an existing feedlot waste treatment system.

Feedlot washwater and wastewater 10 carrying feces and urine is first screened 12 for relatively large solids. The screening method can be anything capable of removing objects with any dimension greater than 80% of the smallest dimension of the hydrocyclone orifice 40. These solids are removed and recycled 14 into bedding by composting methods or other processing methods. The screened wastewater is then transferred to a gravity settling system 16 where inorganic undissolved solids, such as mineral particles, are removed. In existing feedlock waste treatment systems, the supernatant wastewater is then transferred to reservoir lagoons where the remaining suspended particles are decomposed by microbes. However, as described above, such systems run the risk of becoming oxygen deficient and converting to anaerobic decomposition, which results in production of ammonia and nitrates, which are noxious and potentially dangerous to cattle and humans.

The present invention, generally referred to by the reference number 20 in FIG. 1, directs the supernatant wastewater to a hydrocyclone 22 and separation tank 24 system.

Figure 2:
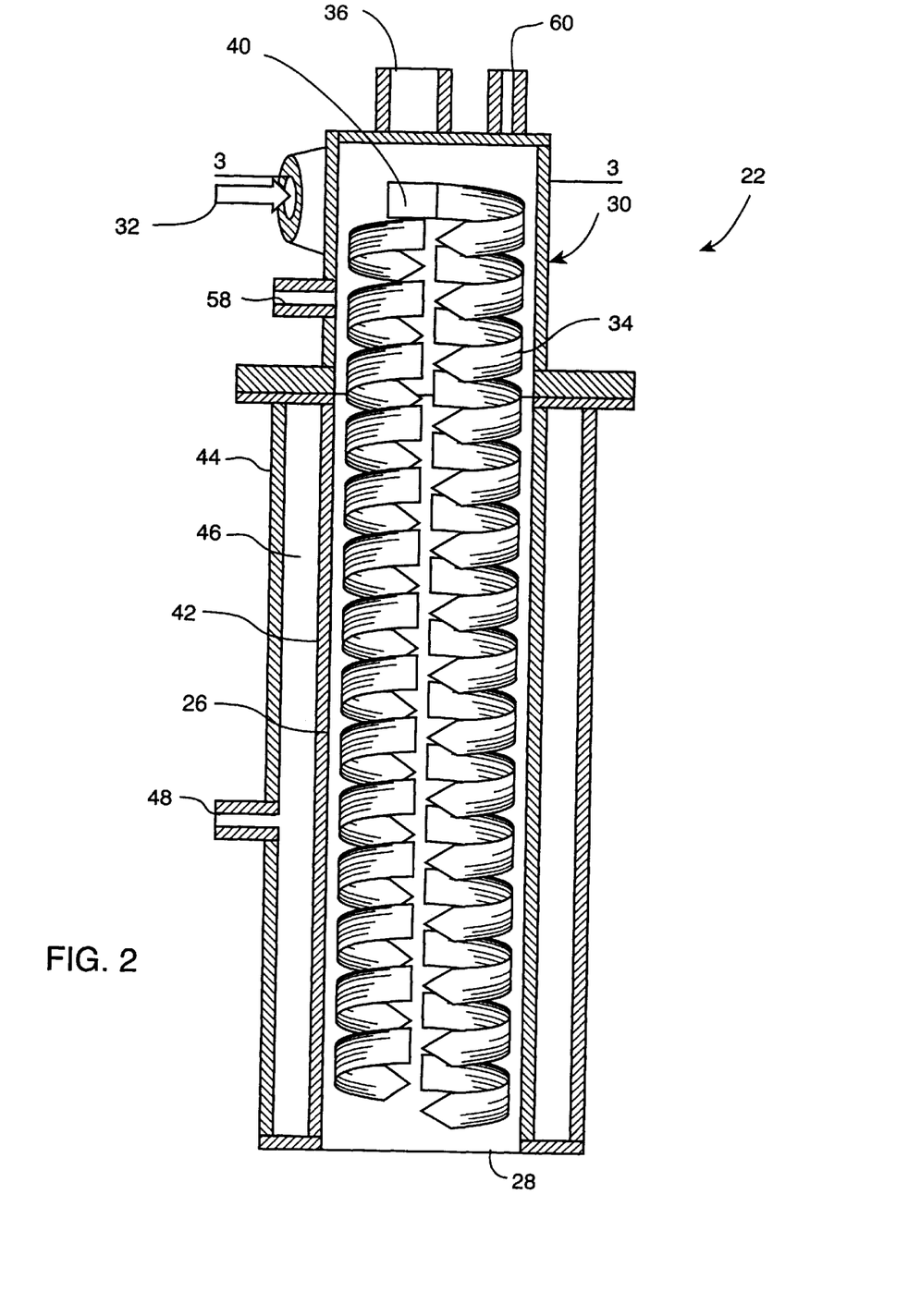
FIG. 2 is a vertical cross-sectional view of an exemplary hydrocyclone utilized in accordance with the present invention.

Referring now to FIG. 2, the hydrocyclone 22 of the simplest embodiment defines a cylindrical treatment environment for creating a bubble-rich environment for a high incidence of bubble-particle collisions. The cylindrical environment forms a passage or chamber defined by a cylindrical inner wall 26, which creates a passage or chamber with an outlet 28 and has an accelerator head 30 at its upstream end. The accelerator head 30 is coupled to a wastewater stream 32 source for receiving the water stream 32 and directing it through the passage in a generally helical fashion 34 along the cylindrical inner wall 26. The head 30 includes a vent 36 to the atmosphere with which to control the entry of atmospheric air. The hydrocyclone 22 creates very small bubbles and causes particles in the wash water 32 to attach to the bubbles. The outlet 28 of the hydrocyclone 22 is submerged in a flotation tank 24 that creates quiescent conditions rapidly and allows flotation of bubble-particle aggregates 38 to the free liquid surface.

Figure 3:
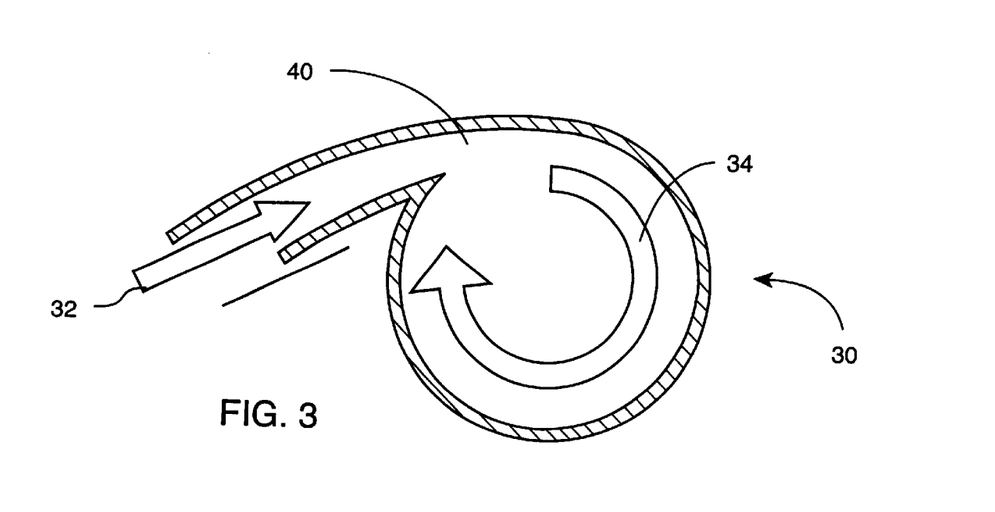
FIG. 3 is a cross-sectional view taken along line 3—3 of FIG. 2, illustrating the entry of the wastewater into the hydrocyclone.

With reference to FIGS. 2 and 3, the accelerator 30, frequently a Kreb's head, accelerates the flow of the liquid wastewater 32 into the hydrocyclone 22. For example, to process approximately 50 gallons per minute, a hydrocyclone 22 with internal diameter of 2" would have to be fed with a pressure of about 40 psi. The liquid is preferably delivered to the hydrocyclone 22 through an inlet 40 in the accelerator 30. The accelerator head 30 has a cylindrical interior. The inlet 40 has a rectangular cross section and is arranged to deliver the liquid 32 in a generally tangential direction relative to the inner wall of accelerator 30 and at a relatively high speed. As is well known, such delivery causes the liquid 32 to flow in the above-described helical manner 34 through the hydrocyclone 22. During the liquid stream's 32 passage through the hydrocyclone 22, bubbles attach to particles and the first step of flotation separation is completed. The hydrocyclone 22 may be in the form of a modified air-sparged hydrocyclone (ASH), as disclosed in U.S. Pat. No. 4,279,743 by Miller or other form of liquid cyclone capable of infusing a large quantity of air or gas bubbles into a helically flowing liquid. The disclosure of U.S. Pat. No. 4,279,743 is expressly incorporated herein by reference for these purposes.

The hydrocyclone 22 may also be in the form of a hydrocyclone, as disclosed in U.S. Pat. No. 6,171,488 by Morse. The disclosure of U.S. Pat. No. 6,171,488 is expressly incorporated herein by reference for these purposes.

Referring to FIG. 2, when the hydrocyclone 22 is a gas-sparged hydrocyclone, it typically includes a cylindrical containment vessel having an open ended porous tube 42 formed of a gas-permeable material. The porous tube 42 includes a cylindrical interior wall 26 defining an inner liquid passage with respective inlet and outlet openings. An enlarged cylindrical hollow housing 44 is disposed concentrically around the porous tube 42 to form an annular plenum 46 enclosing the porous tube. The plenum 46 includes a gas inlet 48 coupled to a source of regulated pressurized air or gas. When the hydrocyclone 22 is air-sparged, the source of air is a blower that generates between 2 and 10 psi at the outer surface of the porous tube. The shearing action of the high velocity solution passing by the pores in the interior wall of the porous tube 42 creates bubbles ranging from sub-micron to several hundred microns in size. The head 20 is vented to atmosphere by an opening at between 10 and 25 percent of the diameter of the inner cylindrical wall 26 of the hydrocyclone 22.

The bubbles created by the hydrocyclone 22 can be induced from the liquid 32 rather than created only by turbulence. A liquid cyclone 22 can be used without sparging air or a gas through the helical liquid flow 34, such as the hydrocyclone 22 illustrated in FIG. 5. In particular, the hydrocyclone 22 can be starved of air at the upstream end by partially closing the vent 36 using any suitable valve 50. The water flowing through the hydrocyclone 22 then creates a low-pressure area inside the liquid helix, and the helical flow 34 closes into a liquid vortex 52 at the downstream end of the hydrocyclone 22. The vortex 52 encloses a space not occupied by liquid and the pressure in this area is less than atmospheric pressure. To create bubbles for particle flotation, the system then relies either on bubbles created from air drawn into the system through vent 36 by the partial vacuum associated with the liquid vortex 52 or on the air dissolved in the liquid before it enters the hydrocyclone 22. In this way, bubbles are induced in the liquid stream 32. In any case, the relative velocities of particles and bubbles is preferably on the order of approximately one meter per second, which creates a substantial likelihood that bubbles and particles will collide to form an aggregate.

Referring back to FIG. 1, the pH of the stream 32 must usually be adjusted to minimize the quantity of polymer needed and optimize performance. Animal waste streams typically have a pH higher than is optimal for performance of suitable coagulants and flocculants. To lower the pH, an additive 54 is added into the pipe upstream of the hydrocyclone 22 at any suitable inlet. Examples of additives that lower pH are sulfuric acid, ferrous sulfate ($FeSO_4$), and $CO_2$ gas.

Figure 5:
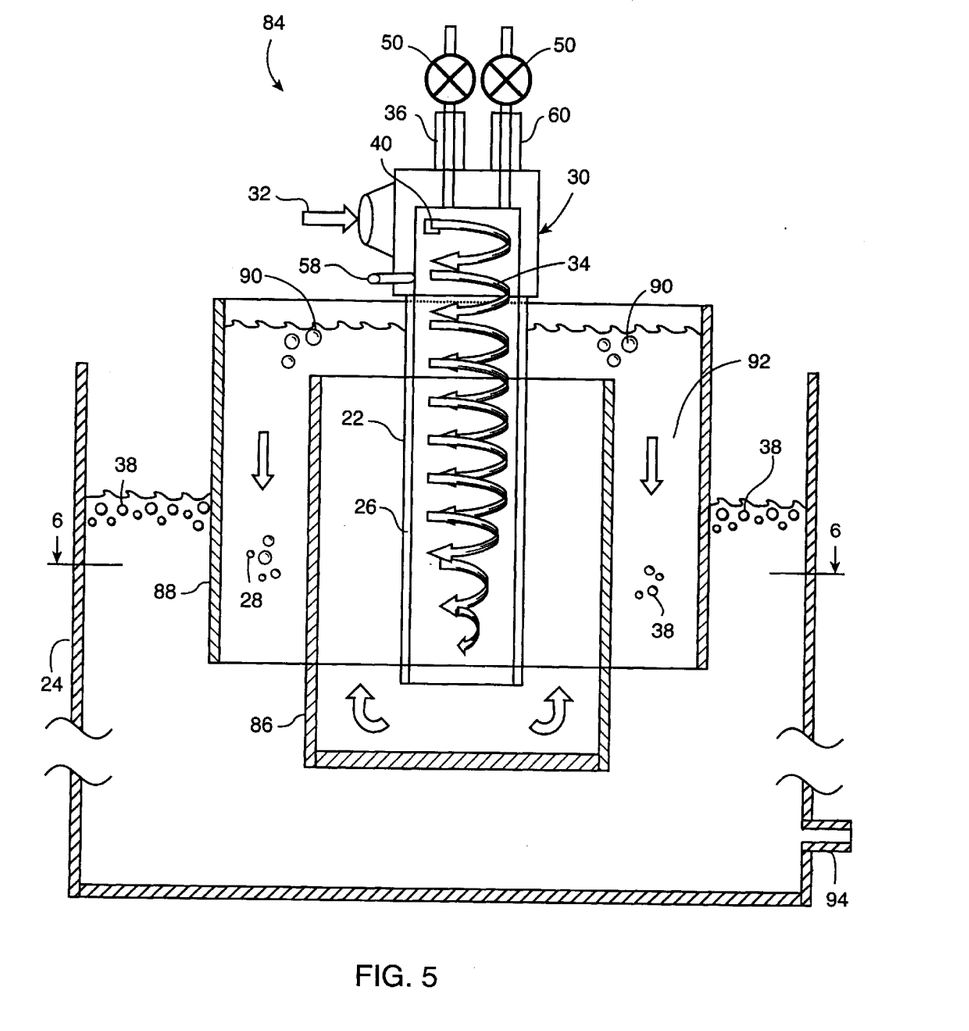
FIG. 5 is a schematic cross-sectional view of a Small Footprint Embodiment, in accordance with the present invention.

Referring now to FIG. 5, provisions for adding a gas to a hycrocyclone operating in the induced air mode previously described is disclosed. A gaseous additive 54 may be added through an inlet 58 or 60 in the accelerator 30. A source of pressurized regulated gas can be attached in any suitable manner at inlet 58 or 60 and fed into the less-than-atmospheric pressure area inside the vortex 52. The inlet 58 or 60 would be equipped with a valve 50 suitable for adjusting flow of the gas. For example, $CO_2$ can be added in this way to reduce the pH of the liquid stream 32.

With reference back to FIG. 1, downstream of the pH additive inlet 56 and upstream of the hydrocyclone 22, one or more additives, such as polymeric coagulants 62 and flocculants, can be added using any suitable inlet 66. The invention mixes these polymeric additives to a configuration that makes the charge sites on the polymer molecule available to contaminants in the water without damaging the polymer molecules. A floc tube 68 sized to allow adequate contact time can be inserted after the inlet 66 for the coagulant 62 and before the stream 32 enters the hydrocyclone 22. Flocculant 64 is typically added into the head 30 of the hydrocyclone 22.

Referring now to FIG. 2, the flocculant 64 can be added vertically into the top of the head 30 at inlet 60. Alternatively, flocculant 64 can be inserted through the wall at inlet 58, radially at least 120° from the inlet of the stream 32 into the head 30 of the hydrocyclone 22, or angled to approximate a tangential entry in the same direction as the flow 34 of the stream 32 in the head 30 of the hydrocyclone 22. Alternatively, the additive inlets 58 and 60 may be used for injecting any liquid or gaseous surface chemistry, such as pH adjustment agents 54, coagulant agents 62, flocculent agents 64, polymer compounds, or chemical catalysts to reduce and reverse the attraction of the particles to the liquid and increase particle-to-particle attractions or liquid-phobic interfaces.

The additive inlet 58 is disposed in the accelerator head 30 downstream of the upper end of the first cylindrical wall 26. In the preferred embodiment, the additive inlet 58 is disposed, for polymers, at least 180 degrees of a turn of the liquid stream 32 around the inside of the cylindrical wall 26 downstream from the inlet 40 into the accelerator head accelerator 30. Additive inlet 58 is sufficiently downstream of the stream inlet 40 to avoid the inlet 40-related pressure drop and shear forces that could damage the polymer molecules and render the polymer less effective. The inlet 58 may be perpendicular to the wall of the hydrocyclone 22 or it may be at an acute angle to the flow of the stream 32 inside the hydrocyclone 22. Alternatively, inlet 58 may be used for non-polymer liquid chemical injection. Inlet 60 is located in the top of the accelerator 30. Injected in these configurations and locations, the liquid additive is swept into the helical flow 34 and mixed with the liquid stream 32 with a minimum of shear force.

Simplest Embodiment

Figure 4:
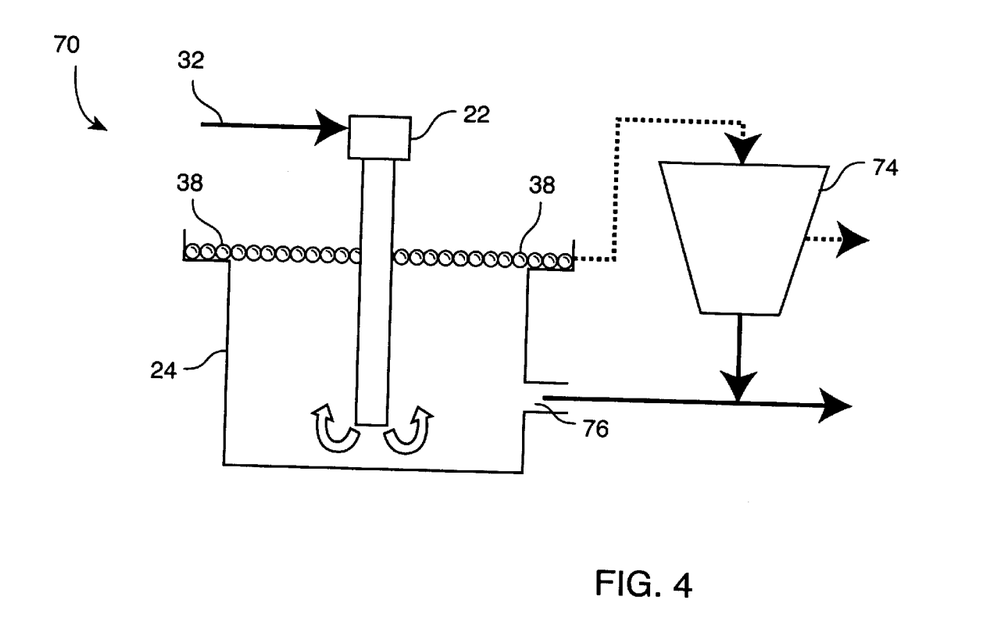
FIG. 4 is a schematic cross-sectional view of the invention in its simplest form.

Referring now to FIG. 4, the simplest embodiment of the present invention, referred to generally by the reference number 70, is disclosed and illustrated. The wastewater stream 32 flows by gravity, or is pumped, from the supernatant of the existing gravity settling pit 38 such that the liquid flows in a helical pattern 34 in the hydrocyclone 22. For example, approximately 40 psi of feed pressure is needed to operate a hydrocyclone 22 with a 2" inner diameter for a flow of approximately 50 gallons per minute. The system 70 is designed to aerate the wastewater stream 32, create bubble-particle aggregates 38, and deliver the aerated stream to a tank 24, where the bubble-particle aggregate 38 and wastewater liquid 32 may rise to the top of the tank 24 and be removed there from in any well known manner. The bubble-particle aggregate froth 38 is dewatered either onsite or offsite so that the remaining sludge can be composted, as indicated in box 72 of FIG. 1. Typically, the froth 38 is removed to a hopper 74 onsite where the froth 38 is dewatered and the sludge is removed to composting 14 for recycle. The now BOD-reduced wastewater 32 is removed from the tank 24 at outlet 76 for transfer to lagoon reservoir 78.

If it is found necessary to remove salt from the treated wastewater 32, a membrane filtration system 80 is placed between the tank 24 and lagoon 78. The treated wastewater 32 is passed through salt-removing filters in this system 80. At this stage of the process, the particle concentration of the wastewater is lowest and membrane blinding is minimized. The salt can then be later disposed of 82.

Small Footprint Embodiment

Figure 6:
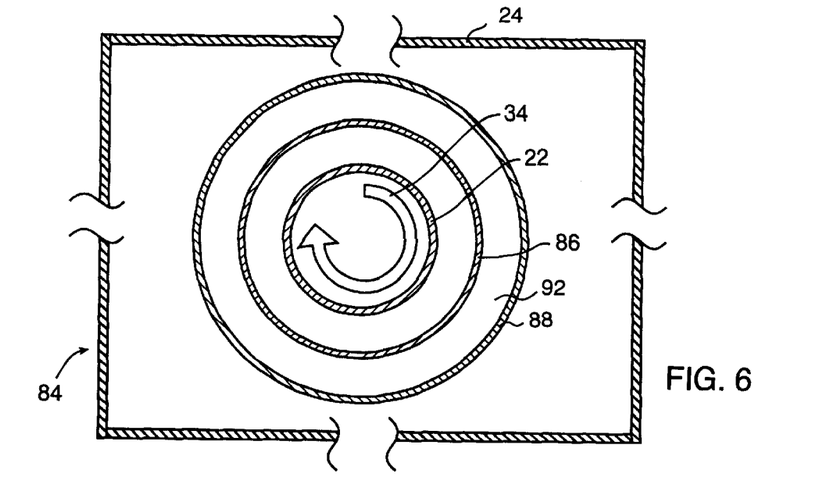
FIG. 6 is a cross-sectional view of the embodiment of FIG. 5, taken along line 6—6.

Referring now to FIGS. 5 and 6, a liquid conditioning system, generally referred to by the reference number 84, according to the Small Footprint Form of the present invention is shown. The system 84 is designed to aerate the stream 32, create bubble-particle aggregates 38, and deliver a diffused flow to a free liquid surface where bubble-particulate aggregates 38 in the liquid 32 may rise to the top of the tank 24 and be removed from the top of the tank 24 in any well known manner.

An innermost baffle forms a second chamber 86 peripherally surrounding the hydrocyclone 22 in a concentric manner, and which is in liquid communication with the outlet 28 of the hydrocyclone 22. Thus, the helically flowing liquid 34 is received in the second chamber 86, which redirects the flow upwards and opens to the surface of a third chamber 88. Large entrained bubbles 90, which would create turbulence in the downstream quiescent zone if allowed to remain entrained in the stream 32, escape from the surface of the third chamber 88, which is typically open to the atmosphere. From the third chamber 88, the stream 32 flows downward through an outlet passage 92 that penetrates the surface of liquid in an outermost chamber defined by the tank 24.

The concentric chambers 22, 86, 88 and 24 of increasing diameter allow the stream 32 exiting the hydrocyclone 22 to slow down and become less turbulent. Thus, they act as a diffuser that delivers the stream 32 gently to the free liquid surface of the outermost chamber 24. As the stream flow reaches the free liquid surface of the outermost chamber 24, bubble-particle aggregates 38 rise to the surface and are not retained in the stream flow 32. The stream flow 32, having left its particle load 38 on the surface, flows downward into the outermost chamber 24 and exits at a submerged outlet 94 to flow to one or more lagoon reservoirs 78. Salt can be removed as described above.

Non-Space-Limited Embodiment

Figure 7:
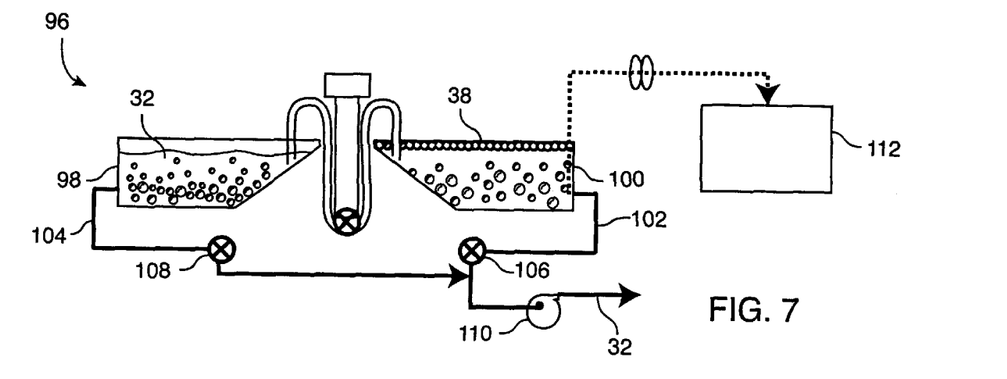
FIG. 7 is a schematic cross-sectional view of a Non-Space-Limited Embodiment, in accordance with the present invention.

Referring now to FIG. 7, in the Non-Space-Limited Embodiment, generally referred to by the reference number 96, the hydrocyclone 22 exits to one of two flotation separation pits 98 and 100. Part of the bottom of each pit 98 and 100 is sloped at an angle to allow a vehicle to be driven therein. Each pit 98 and 100 is equipped with an outlet 102 and 104 connected to a line to one or more lagoons 78, a flow control device (e.g., weir or valve) 106 and 108 at the pit 98 and 100, and if necessary, a pump 110. While the stream 32 exiting the hydrocyclone 22 makes a submerged entry into one pit (the receiving pit 98), the other pit (quiescent pit 100) has no influent and is quiescent. In the quiescent pit 100, bubble-particle aggregates 38 rise to the surface, creating a froth layer 38 and an underlying liquid layer 126. In the froth layer 38, froth dewaters over several hours and liquid drains into the liquid layer 32. Once separation has maximized, the liquid layer 32 is pumped out or flows by gravity from the quiescent pit 100 to one or more lagoons 78. The drier froth 38 is scooped out or pumped out using any suitable vehicle. Because the froth retains the fine carboniferous organic matter, it contains adequate carbon for composting. It can be composted onsite 112, or hauled offsite. When the quiescent pit 100 is empty, the flow from the hydrocyclone 22 is switched over, and the receiving pit 98 functions as the quiescent pit.

Alternatively two hydrocyclones 22 may be mounted on brackets above two or more existing pits 98 and 100 such that the exit of each hydrocyclone 22 is submerged in the water of the pit 98 or 100. Influent is switched from one to the other as described above. Tanks can be substituted for pits. Salt can also be removed as described above.

Vaned Tank Embodiment

Figure 8:
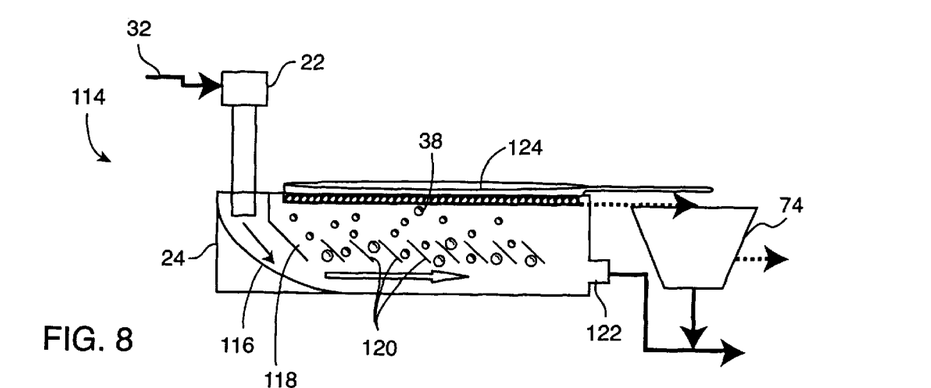
FIG. 8 is a schematic cross-sectional view of a Vaned Tank Embodiment, in accordance with the present invention.

Referring now to FIG. 8, in the Vaned Tank Embodiment, referred to generally by the reference number 114, the hydrocyclone 22 exits its stream 32 into tank 24 in which the outlet 28 of the hydrocyclone 22 is immersed. The stream 32 makes a submerged entry between downwardly directed ramp 116 and a baffle 118 that smoothly redirect the liquid flow from vertical to horizontal. Vanes 120 are arranged down the length of the tank 24 and allow bubble-particle aggregates 38 to rise to the free liquid surface of the tank 24 while the mass flow of the wastewater in the stream continues horizontally to the submerged tank outlet 122. The water flows out of the tank 24 to one or more existing lagoon reservoirs 78. The layer of bubble-particle aggregates 38 on the surface is removed with a skimmer 124 into one or more cone-bottom containers, such as the hopper 74. In the hopper 74, the froth dewaters in a manner similar to the pits in the Non-Space Limited Embodiment. Salt can be removed as described above.

It will be understood by those having skill in the art that the present invention may be used in connection with an existing treatment feedlot waste treatment system. It will reduce the acreage needed for lagoons and thereby result in a net savings in land use for feedlot waste treatment. Alternatively, the invention may be incorporated into an entirely new waste treatment system.

Those skilled in the art will appreciate the advantages afforded by the present invention. Of particular significance is the capability of retrofitting existing treatment systems to become more efficient in removing particulates from feedlot wastewater, while at the same time requiring few modifications to the existing system. Additionally, by introducing rapid bubble-particle formation, flotation can be used to remove contaminants. By introducing a hydrocyclone 22, the flotation process becomes adjustable in real time and the entire stream is aerated. With the exception of the hydrocyclone 22 and the optional salt membrane filtration system 80, the equipment of which the invention consists is familiar farm equipment, i.e. pumps, valves, pipes, tanks, motors. Most embodiments require no software or electronic control system. The hydrocyclone 22 itself has no moving parts and so is essentially maintenance-free.

Although several embodiments have been described in detail for purposes of illustration, various modifications may be made to each without departing from the scope and spirit of the invention. Accordingly, the invention is not to be limited, except as by the appended claims.

What is claimed is:

1. A method for treating feedlot waste, comprising the steps of:
    screening coarse solids from animal wastewater;
    removing inorganic undissolved solids from the screened wastewater;
    creating bubble-particle aggregates by directing the wastewater into an inlet of a hydrocyclone, and channeling the wastewater from an outlet of the hydrocyclone to a tank; and
    separating the bubble-particle aggregates from the wastewater by allowing the bubble-particle aggregates to rise and accumulate on a free liquid surface of the tank and treated wastewater to settle below the bubble-particle aggregates for discharge from said tank;
    wherein the creating and separating steps are accomplished using a system comprising:
        a first chamber defined by the hydrocyclone, the hydrocyclone being configured to pass the wastewater therethrough in a generally helical manner to create the bubble-particle aggregates;
        a second chamber peripherally surrounding the outlet of the hydrocyclone and in fluid communication with the outlet of the hydrocyclone, the second chamber having a generally upwardly directed outlet;
        a third chamber peripherally surrounding the outlet of the second chamber and in fluid communication with the outlet of the second chamber, the third chamber having a generally downwardly directed outlet; and
        a fourth chamber defined by the tank peripherally surrounding the outlet of the third chamber and in fluid communication with the outlet of the third chamber.

2. The method of claim 1, including the step of removing the bubble-particle aggregates from the tank.

3. The method of claim 1, including the step of transferring the treated wastewater to a reservoir.

4. The method of claim 1, including the step of adding a pH adjusting chemical to the wastewater before the creating step.

5. The method of claim 1, including the step of adding a coagulant to the wastewater before the creating step.

6. The method of claim 1, including the step of adding a flocculant to the wastewater before the creating step.

7. The method of claim 3, including the step of removing salts from the wastewater before the transferring step.

8. The method of claim 7, wherein the removing salts step is accomplished by filtering the wastewater through salt-removing filters.

9. A method for treating feedlot waste, comprising the steps of:
    screening coarse solids from animal wastewater;
    removing inorganic undissolved solids from the screened wastewater;
    creating bubble-particle aggregates by directing the wastewater into an inlet of a hydrocyclone, and channeling the wastewater from an outlet of the hydrocyclone to a tank; and
    separating the bubble-particle aggregates from the wastewater by allowing the bubble-particle aggregates to rise and accumulate on a free liquid surface of the tank and the wastewater to settle below the bubble-particle aggregates;
    wherein the creating and separating steps are accomplished using a system comprising:
        the hydrocyclone in fluid communication with the wastewater with the inlet thereof, the hydrocyclone being configured to pass the wastewater therethrough in a generally helical manner to create the bubble-particle aggregates;
        first and second pits in alternate fluid communication with the outlet of the hydrocyclone, the first and second pits alternately serving as a receiving pit when receiving wastewater from the hydrocyclone, and a quiescent separation pit when not receiving wastewater from the hydrocyclone;
        an outlet for transferring the treated wastewater from the quiescent separation pit to the reservoir; and
        means for removing the bubble-particle aggregates from the quiescent pit.

10. The method of claim 9, including the step of removing the bubble-particle aggregates from the tank.

11. The method of claim 9, including the step of transferring the treated wastewater to a reservoir.

12. The method of claim 9, including the step of adding a pH adjusting chemical to the wastewater before the creating step.

13. The method of claim 9, including the step of adding a coagulant to the wastewater before the creating step.

14. The method of claim 9, including the step of adding a flocculant to the wastewater before the creating step.

15. The method of claim 11, including the step of removing salts from the wastewater before the transferring step.

16. The method of claim 15, wherein the removing salts step is accomplished by filtering the wastewater through salt-removing filters.

* * * * *